United States Patent [19]

Okumura et al.

[11] Patent Number: 5,075,708
[45] Date of Patent: Dec. 24, 1991

[54] CAMERA

[75] Inventors: Yoichiro Okumura; Yasuo Asakura; Keita Takahashi, all of Hachioji, Japan

[73] Assignee: Olympus Optical Co., Ltd., Japan

[21] Appl. No.: 619,071

[22] Filed: Nov. 28, 1990

[30] Foreign Application Priority Data

Dec. 5, 1989 [JP] Japan .................. 1-316697

[51] Int. Cl.⁵ ............................. G03B 1/12
[52] U.S. Cl. ................................ 354/173.1
[58] Field of Search ..................... 354/173.1

[56] References Cited

U.S. PATENT DOCUMENTS 2,353,154  7/1944  Fowler ................. 354/173.1
2,511,157  6/1950  Gorey .................. 354/173.1
4,720,719  1/1988  Hamada et al. ......... 354/173.1

Primary Examiner—Michael L. Gellner
Attorney, Agent, or Firm—Louis Weinstein

[57] ABSTRACT

An automatic camera charging apparatus having a film housing chamber arranged on the camera body side and a film winding chamber arranged on the camera back lid side so that, when a film is inserted at the tip into a film inserting port while the back lid is opened, it may be detected, a pre-load of winding the film at the tip on a spool at a fixed speed may be made, and then the film may be vacantly fed in response to the back lid closing operation and thus the camera may be automatically charged with the film.

20 Claims, 13 Drawing Sheets

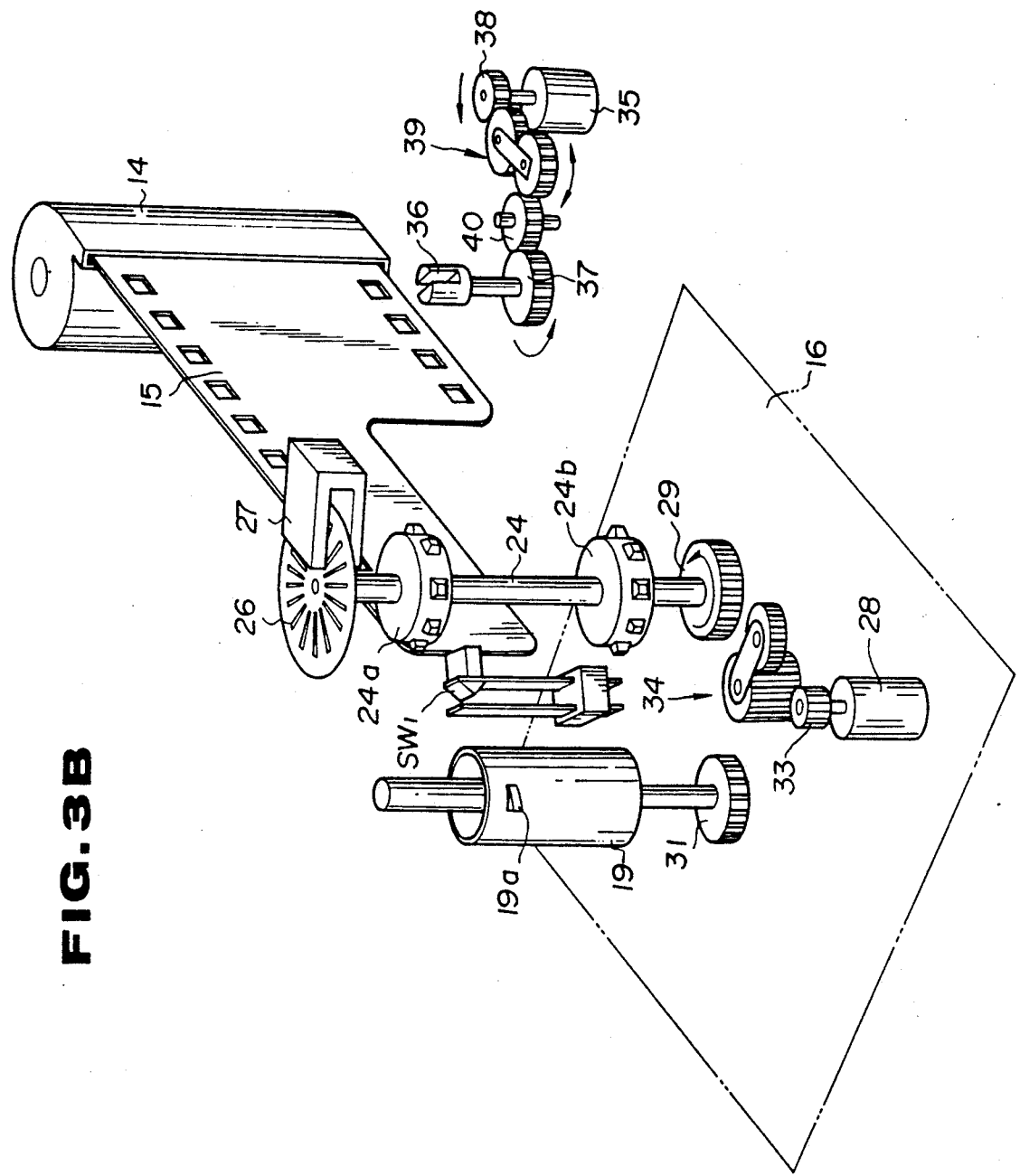

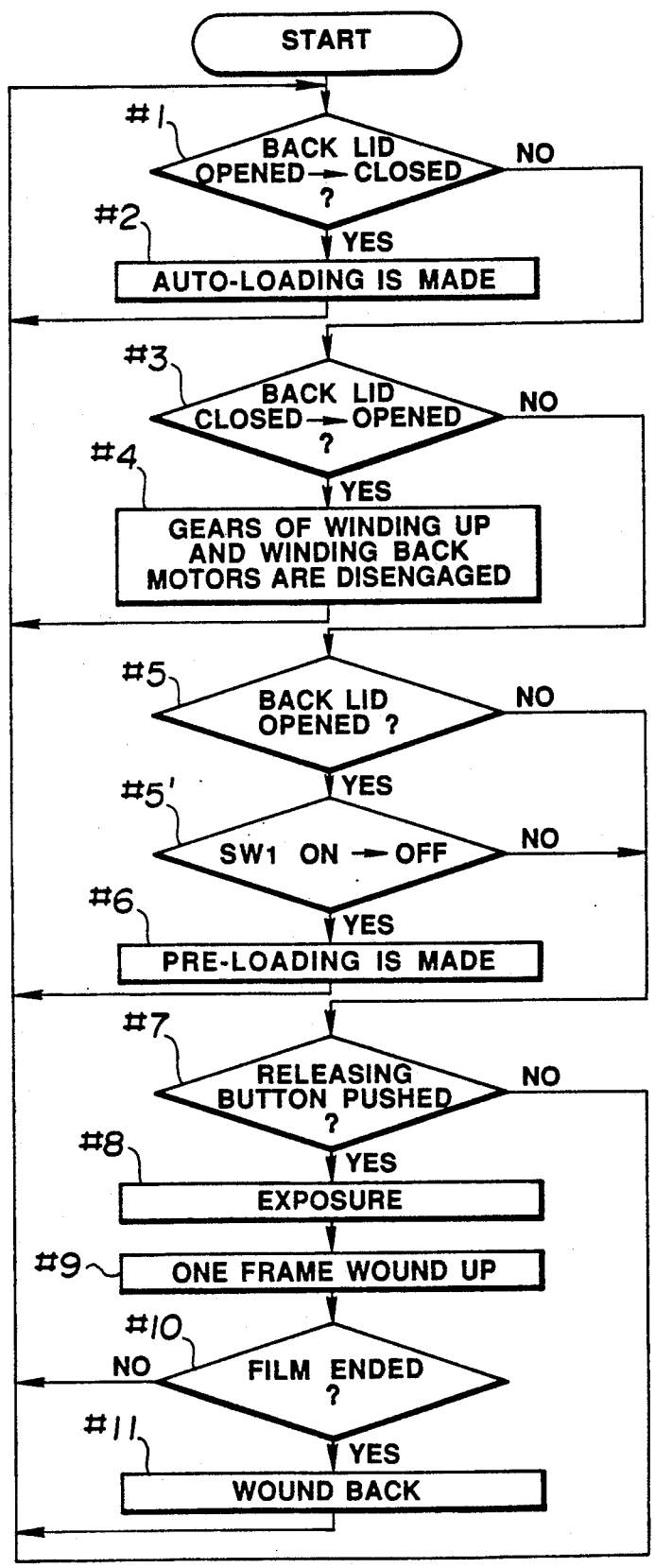

$$\text{DRIVE RATIO } D = \frac{100 - a}{100} \times 100(\%)$$

$$a \div b = 100$$

CAMERA

BACKGROUND OF THE INVENTION

This invention relates to cameras and more particularly to an automatic film charging apparatus of a camera.

In a conventional automatic film charged camera using a roll film of a width of 35 mm. or the like, a film housing chamber charged with a film magazine and a winding chamber having a film spool have been provided in the camera body. That is to say, as an example is shown in FIG. 12, a camera body 101 fitted in the center of the front surface with a lens barrel 102 having a photographing lens 103 is provided on the left and right holding a photographing light path between them respectively with a film housing chamber 105 to be charged with a film magazine (film patrone) 104 and a film winding chamber 107 provided with a spool for winding up a film so that a roll film 110 pulled out of the film magazine 104 may be stretched across a film aperture window (an opening defining the photographed picture) provided to correspond to the photographing lens 103 and then may be wound up on the above-mentioned spool 106. The camera body 101 is covered on the back surface side with a back lid 108 so as to be free to open and close and further a shutter unit 109 is provided just in front of the film aperture window.

At the time of charging the camera with a film, when the camera user opens the back lid 108, mounts in a designated position of the spool 106 the tip of the film leader part of the film magazine set within the film housing chamber 105 and closes the back lid 108, the film will be automatically vacantly fed from the leader part to the first frame and the first picture will be able to be taken.

Now, in the above-mentioned conventional camera wherein the film housing chamber and film feeding chamber are on the camera body side, the lateral width of the camera must be long and the portability is not good. Therefore, in order to make it more portable, it is considered to reduce the lateral width of the camera. As a means of practicing it, it is suggested to provide the film housing chamber on the camera body side and provide the film winding chamber on the back lid side in the rear of the film aperture window.

However, if the film winding chamber is arranged on the back lid side of the camera, in the mechanism of the camera, the film winding chamber will expose on the camera body side only the film tip inserting port, the spool will not be seen from outside and therefore, in charging the camera with a film, the user will insert the tip of the film leader part into the film inserting port and then will close the back lid. However, this operation has problems that, as it can not be confirmed whether the film leader part is positively wound up on the spool, there will be much anxiety and the possibility of the film vacant feeding failure will be high.

SUMMARY OF THE INVENTION

An object of the present invention is to provide a highly portable camera provided on the camera body side with a film housing chamber and on the back lid side of the camera with a film winding chamber and having an automatic film charging apparatus for automatically charging the camera with a film by winding the tip part of the film on a spool when the back lid is open and then vacantly feeding the film in response to the operation of closing the back lid.

According to the present invention, means are provided so that, when the tip part of a film is inserted into a film inserting port, a pre-load of detecting it and automatically winding the film tip part on a spool at a slow constant speed will be made, and will wind correctly a predetermined length from the film inserting port to the winding spool of the film, to positively wind in the film and will auto-load (vacant feeding of the film) without fail when the back lid is closed. Therefore, there is obtained the effect that the waste of the film may be reduced.

BRIEF DESCRIPTION OF THE DRAWINGS

FIG. 2A is a view of a back lid as closed.

FIG. 2B is a view of the back lid as opened.

FIGS. 3A and 3B are waveform and circuit perspective views showing a film feeding mechanism.

FIG. 5 is a flow chart showing the operation of a camera having the automatic film charging appartus of the above-mentioned first embodiment.

DETAILED DESCRIPTION OF PREFERRED EMBODIMENTS

Figure 1:
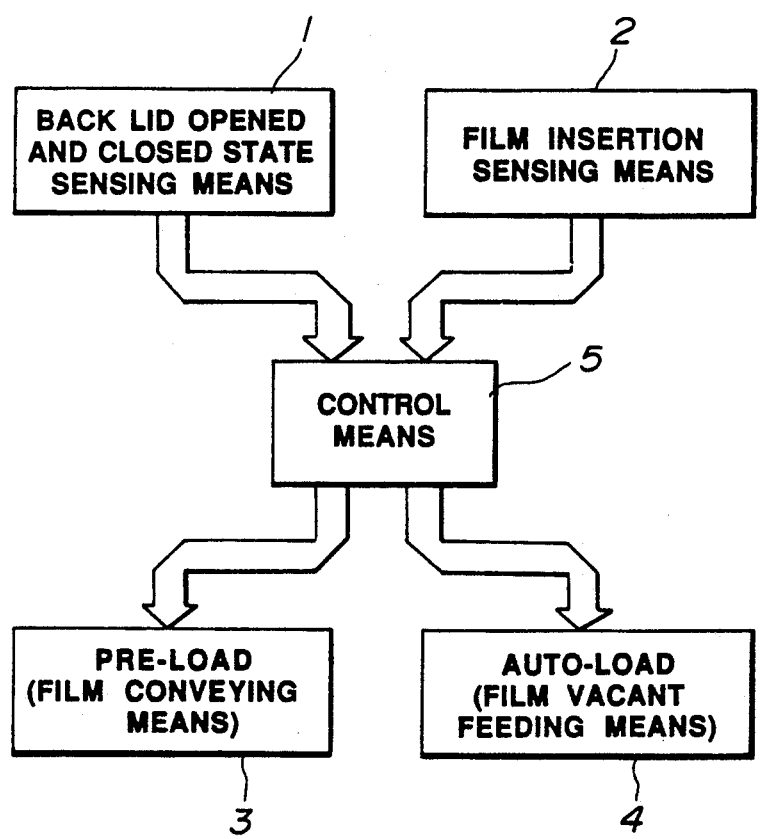
FIG. 1 is a block diagram showing the conception of the present invention.
Figure 2A:
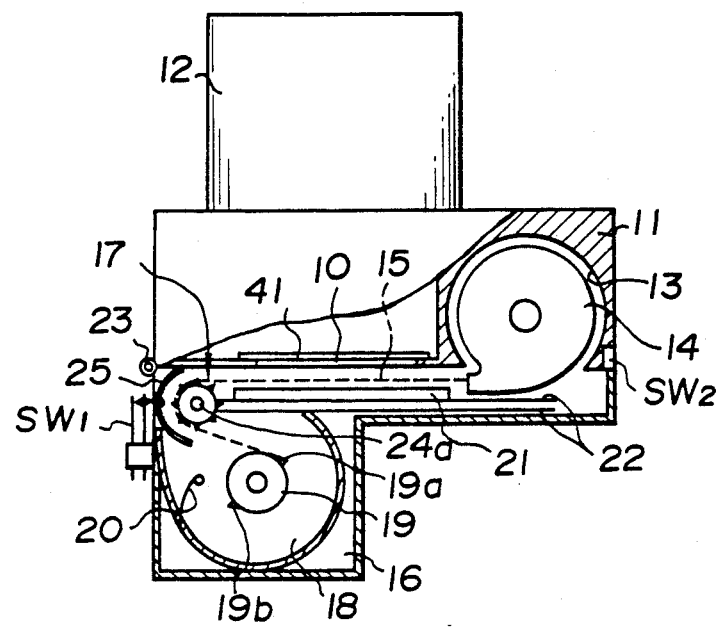
FIGS. 2A and 2B are schematic formation views of an automatic film charging apparatus of a camera showing a first embodiment of the present invention.
Figure 2B:
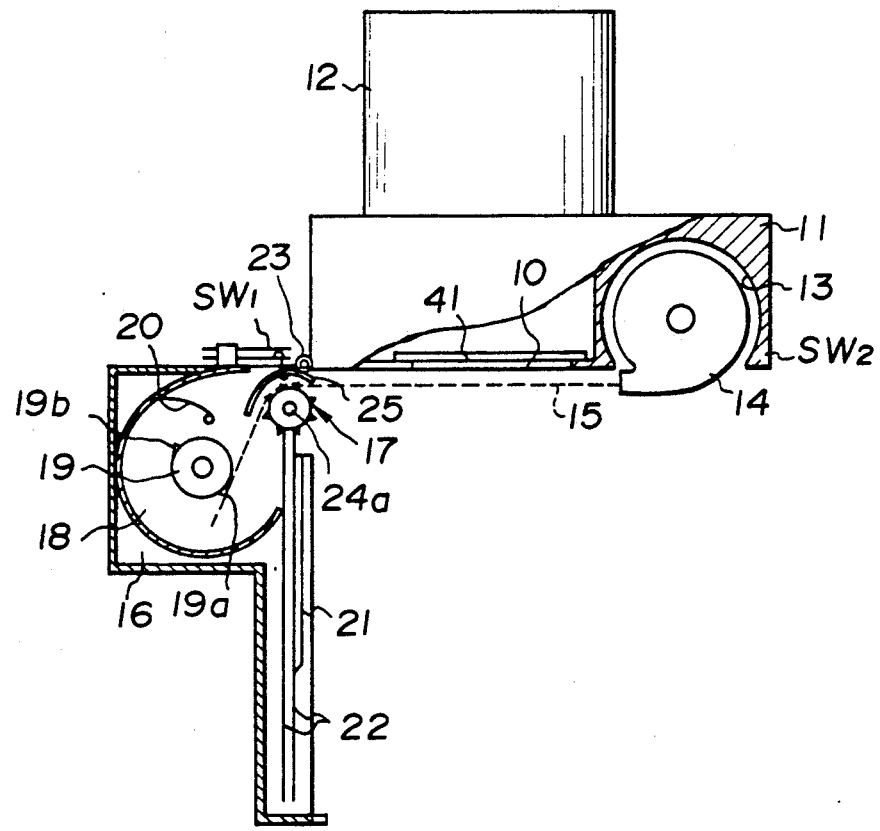

As its basic concept is shown in FIG. 1, the automatic film charging apparatus in a camera according to the present invention comprises a back lid opened and closed state sensing means 1 for sensing the opened and closed states of a back lid to a camera body having a film housing chamber so as to be free to open and close, a sensing means 2 for sensing whether a film is inserted or not into a film tip inserting port exposed on the camera body side of a film winding chamber provided in the above-mentioned back lid, a pre-load (film conveying means) 3 for driving the film inserted into the above-mentioned inserting port so as to be wound on a spool within the above-mentioned film winding chamber, an auto-load (film winding means) 4 for winding up the film tip part wound on the spool by this pre-load 3 by rotating the spool and a control means 5 for controlling the film to be vacantly fed by operating the above mentioned pre-load 3 in case the above mentioned film insertion sensing means 2 issues a detecting signal when the above-mentioned back lid opened and closed state sensing means 1 is outputting a back lid opened state signal and then operating the above-mentioned autoload 4 in case the back lid opened and closed state sensing means 1 detects the back lid closing operation. FIGS. 2A, 2B and 3 are schematic formation views of an automatic film charging apparatus in a camera showing the first embodiment of the present invention. A camera body 11 fitted on the front surface with a lens barrel 12 having a photographing lens is provided on one side with a film housing chamber 13 so that a film 15 pulled out of a film magazine 14 set within the same film housing chamber 13 may be stretched across an aperture window, that is, an opening 10 defining a photographed picture, provided in the rear of the photographing lens, then the tip of the leader part of the film may be inserted into a film inserting port 17 provided on the back lid 16 side and thereby the camera may be automatically charged with the film 15.

The above-mentioned back lid 16 is fitted so as to be free to open and close with respect to the camera body 11 by a hinge 23 in the corner part of the camera body on the side opposite the above-mentioned film housing chamber and a film winding chamber 18 is formed so as to project on the rear side of the camera body part on the hinge 23 side. A film winding spool 19 is arranged in the central part within this film winding chamber 18. On the same spool 19, film hanging pawls 19a and 19b are formed in the positions corresponding to film perforations in the symmetrical positions on the barrel periphery so that the film 15 may be wound on the barrel periphery of the spool 19 in cooperation with a film pressing arm 20 extended out of the inner wall of the above mentined winding chamber 18.

Also, on the opened surface corresponding to the back surface of the camera body 11 of the above-mentioned back lid 16, a pressing plate 21 for pressing the back surface of the film 15 stretched across the above-mentioned aperture window 10 is arranged as fitted to plate springs 22. On the above-mentioned hinge 23 side of these plate springs 22, film winding sprocket wheels 24a and 24b (See FIG. 3) are fitted to the back lid 16 as arranged to correspond to the perforations of the film 15.

The film directed rearward by these sprocket wheels 24a and 24b is wound up on the above-mentioned sprocket 19 so that the light sensitive surface may be directed inward. On the above-mentioned hinge 23 side peripheries of the above-mentioned sprocket wheels 24a and 24b, a film guide 25 of a partial arcuate cross-sectional shape is provided in the back lid 16 and, by the clearance between this film guide 25 and the above-mentioned sprocket wheels 24a and 24b, the above-mentioned film inserting port 17 exposed toward the camera body 11 is provided. Near this film inserting port 17 is provided a film insertion sensing switch $SW_1$ for detecting that the tip part of the film 15 is inserted into the inserting port 17 and near the film housing chamber 13 of the above-mentioned camera body 11 is arranged a back lid state sensing switch for detecting the opened and closed state of the back lid 16 of the camera.

Figure 3A:
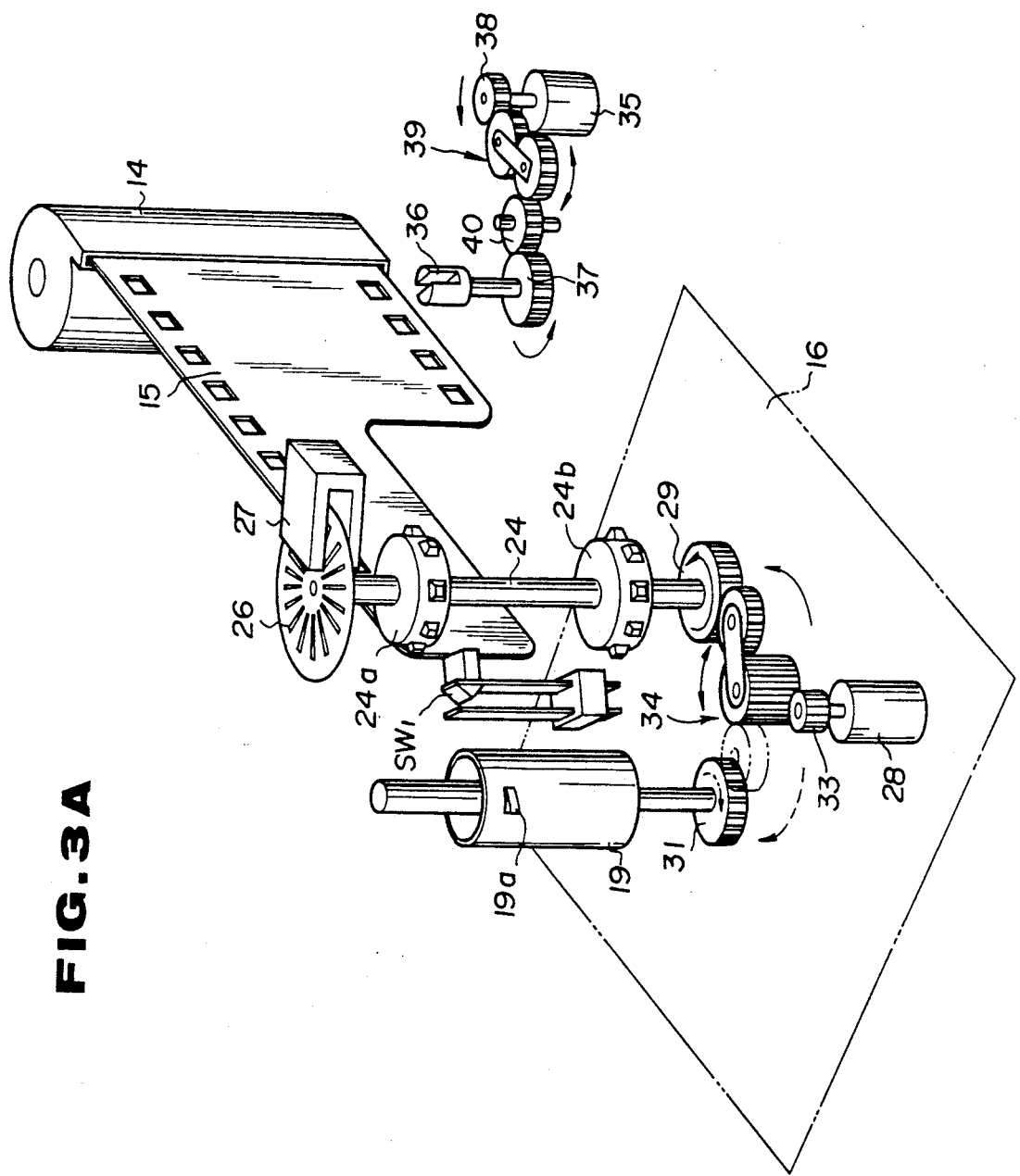

As shown in FIGS. 3A and 3B, at the upper end of a sprocket shaft 24 having the above-mentioned sprocket wheels 24a and 24b fixed above and below is fixed a slit plate 26 for detecting the moving speed and moved amount of the film so that the number of slits by the rotation of the same slit plate 26 may be detected by a photointerrupter 27 and may be output as a pulse signal.

The above-mentioned sprocket shaft 24 and spool 19 are rotated and driven by a winding motor 28 provided within the back lid 16. That is to say, between a driving gear 29 fixed to the the above-mentioned sprocket shaft 24 and a driving gear 31 fixed to the supporting shaft of the above-mentioned spool 19, there is a clutch mechanism 34 comprised of a planetary gear mechanism so that a rotary driving force may be transmitted in response to the rotating direction of the motor 28 selectively to the above-mentioned driving gears 29 and 31 through the clutch mechanism 34 from the output gear 33 of the film winding motor 28. FIG. 3A shows the above-mentioned clutch mechanism 34 as meshed with the driving gear 29. FIG. 3B shows the above-mentioned clutch mechanism as disengaged from the driving gear 29 by the reverse rotation of the motor.

On the other hand, after the photographing ends, the film 15 with which the above-mentioned film housing chamber 13 is charged will be automatically wound back into the film magazine 14 by a film rewinding motor 35. That is to say, a fork member 36 will be fitted to a film winding frame within the film magazine 14 with which the film housing chamber 13 is charged and a rotating driving force will be transmitted to a driving gear 37 fixed to the same member 36 from an output gear 38 of the film winding back motor 35 through a clutch mechanism 39 comprising a planetary gear mechanism and a transmission gear 40.

By the way, in FIGS. 2A and 2B, the reference numeral 41 represents a shutter unit arranged on the front surface of the aperture window 10 which is an opening defining the photographed picture.

Figure 4:
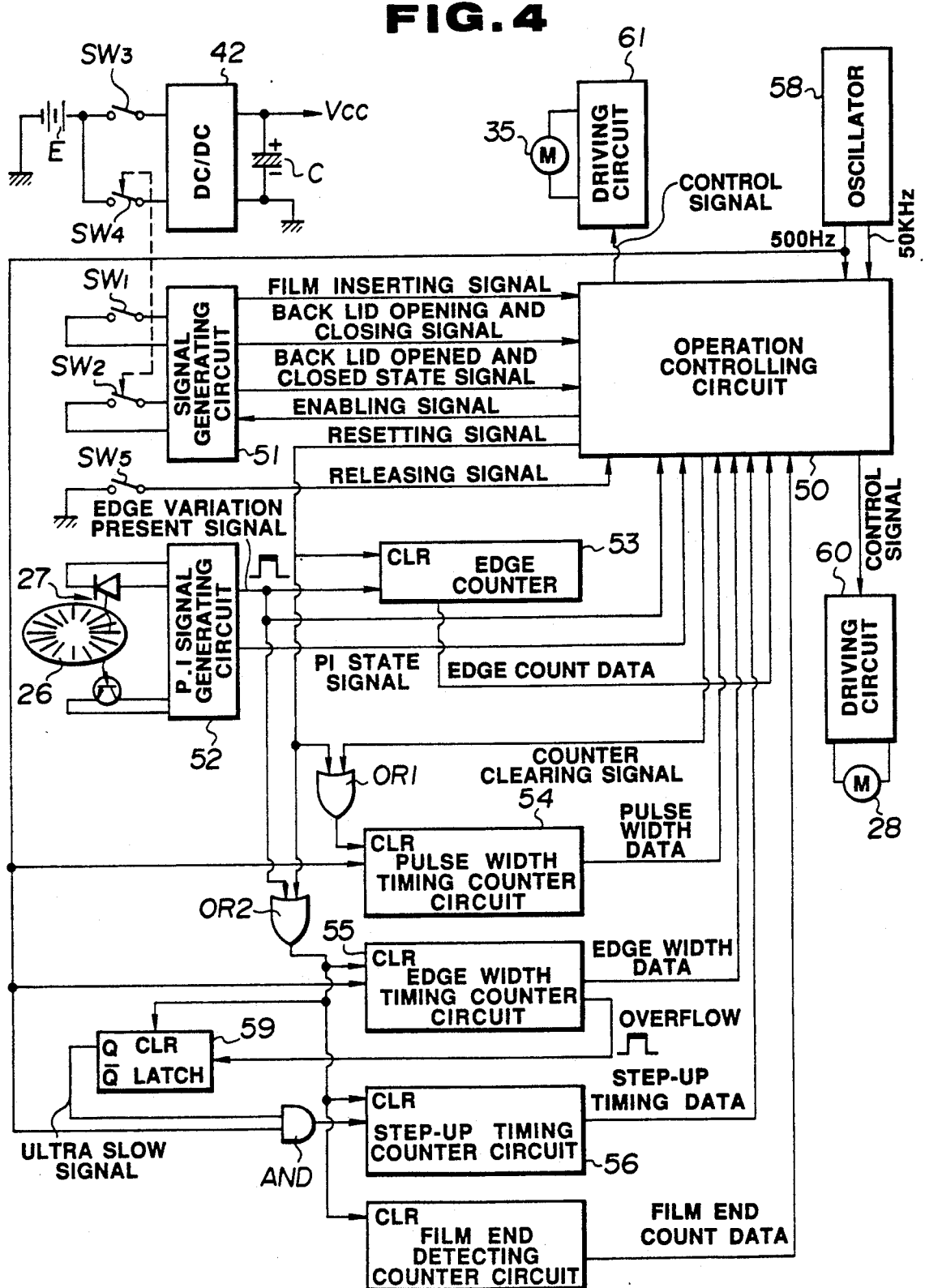
FIG. 4 is a block formation diagram of an electric circuit of the automatic film charging apparatus of the above-mentioned first embodiment.

Now, FIG. 4 is a block formation diagram of an electric circuit of the above-mentioned automatic film charging apparatus of the camera. When a power switch $SW_3$ is switched on, an electric current will be fed from a power source battery E to a DC-DC converter 42 transforming the voltage of the same power source battery to a predetermined voltage and an operating voltage $V_{cc}$ will be fed to each circuit from the same converter. A switch $SW_4$ provided in parallel with the power switch $SW_3$ is operatively connected with the above-mentioned back lid state sensing switch $SW_2$ so as to be on by the opened state (See FIG. 2B) of the back lid 16 and connect the power source E to the above-mentioned DC-DC converter 42. A condenser C of a large capacity connected to the above mentioned DC-DC converter 42 at the output end will play a role of flowing a current to the entire circuit for a slight time even if the DC-DC converter 42 is off.

A film insertion sensing switch $SW_1$ provided near the above-mentioned film inserting port 17 is a switch for detecting that the film tip part is inserted and will change to be off from being on when the film is inserted. By this on→off change, the signal generating circuit 51 will generate a film inserting signal and will input it into an operation controlling circuit. Also, this signal generating circuit 51 will output a back lid opening and closing signal by the on→off or off→on change of the back lid state sensing switch $SW_2$ which will be on when the back lid is opened and will be off when it is closed and further, by the on or off state of the above-mentioned switch $SW_2$. The signal generating circuit 51 will generate a back lid opened or closed state signal and these signals will be inputted into the operation controlling circuit 50. When an enabling signal is inputted from the operation controlling circuit 50, this signal generating circuit 51 will be activated.

When a shutter releasing button (not illustrated) is pushed down, the releasing switch $SW_5$ will be on and will output a releasing signal toward the above-mentioned operation controlling circuit 50.

On the other hand, the above-mentioned photointerrupter (abbreviated as PI hereinafter) outputting a pulse signal by photoelectrically reading the slits of the above-mentioned slit plate 26 rotated together with the sprocket wheels 24a and 24b by the movement of the film will input a PI signal consisting of its pulse signal into a PI signal generating circuit 52 which will detect the variation of the PI signal and will output an edge variation present signal of the pulse signal and the state of the PI signal. This edge variation present signal will be inputted into the edge counter circuit 53, the above-mentioned operation controlling circuit 50 and OR gate OR 2 and the above-mentioned PI state signal will be inputted into the operation controlling circuit 50.

The above-mentioned edge counter circuit 53 will have the counter value cleared to "0" by the resetting signal from the operation controlling circuit 50, will count the edge number of the above-mentioned PI pulse signal and will output the counted value as edge count data to the operation controlling circuit 50.

The resetting signal output from the above-mentioned operation controlling circuit 50 will be input into the clearing terminal of the above-mentioned edge counter circuit 53, the clearing terminal of the pulse width timing counter circuit 54 through the OR gate OR 1, the clearing terminal of the edge width timing counter circuit 55 through the OR gate OR 2, the clearing terminal of the step-up timing counter circuit 56 and the clearing terminal of the film end detecting counter circuit 57.

The above-mentioned pulse width timing counter circuit 54 will have the counter value cleared to "0" by the above-mentioned resetting signal or the counter clearing signal output from the operation controlling circuit 50 and inputted into the clearing terminal through the above-mentioned OR gate OR 1, will count the pulse signal number, for example, of 500 Hz output from the oscillator 58 and will output the counted value as pulse width data to the operation controlling circuit 50.

The above-mentioned edge width timing counter circuit 55 will have the counter value cleared by the above-mentioned resetting signal from the OR gate OR 2 or the above-mentioned edge variation present signal, will count the pulse signal number of 500 Hz output from the above-mentioned oscillator 58, will output to the operation controlling circuit 50 the counted value as edge width data and will output an overflow signal to the latch 59 when the counted value reaches a predetermined number.

The above-mentioned latch 59 will memorize the overflow signal cleared by the resetting signal from the OR gate OR 2 or the edge variation present signal and outputted from the above-mentioned edge width timing counter circuit 55 and will output to the AND gate AND this overflow signal as a super-slow signal.

The above-mentioned step-up timing counter circuit 56 will have the counted value cleared by the resetting signal from the OR gate OR 2 or the edge variation present signal, will count the pulse signal number of 500 Hz output from the above mentioned oscillator 58 when the ultra slow signal input into the above-mentioned AND gate AND is outputted and will output to the operation controlling circuit 50 the counted value as step-up timing data.

The above-mentioned film end detecting counter circuit 57, which is cleared by the resetting signal from the OR gate OR 2 or the edge variation present signal, will count the pulse signal number of 500 Hz output from the above-mentioned oscillator 58 when the super-slow signal input into the above-mentioned AND gate is outputted and will output the pulse signal number as film end count data to the operation controlling circuit 50.

The above-mentioned operation controlling circuit 50, which comprises an operation register, ROM memorizing programs and MPU (microprocessing unit) provided with a plurality of input and output ports, will input the above-mentioned film inserting signal, back lid opening and closing signal, back lid opened and closed state signal, releasing signal, PI edge variation present signal, PI state signal, pulse width data, edge width data, edge count data, step-up timing data, film end count data and respective signals of 500 Hz and 50 KHz from the above-mentioned oscillator 50, will output the resetting signal, enabling signal, counter clearing signal, control signal of the winding motor 28 and control signal of the winding back motor 35 and will carry out the program in the ROM by the power only set.

The above-mentioned winding motor 28 will make the normal rotation, short braking, reverse rotation and off-drive by the driving circuit 60 operated by the control signal from the operation controlling circuit 50. The above-mentioned rewinding motor 35 will make the normal rotation, short braking, reverse rotation and off-drive by the above-mentioned control signal.

The above-mentioned oscillator 58 will output frequency signals, for example, of 500 Hz and 50 Hz, will count a cycle of 50 KHz in the basic cycle of 500 Hz, in the case of a duty drive and will realize a drive ratio of a brake/normal rotation or off/normal rotation.

The operation of the automatic film charging apparatus formed as mentioned above shall be explained in the following. FIG. 5 is a treatment (i.e., operation) flow in the case that the above-mentioned operation controlling circuit 50 is formed of the above-mentioned MPU. For convenience sake, this treatment flow shall relate only to the film drive and unnecessary parts shall be omitted.

First of all, by the operation of switching on the power switch $SW_3$ or the switch $SW_4$ operatively connected with the back lid 16 (See FIGS. 2A and 2B), the DC-DC converter 42 will operate, an operating voltage $V_{cc}$ will be applied to the electric circuit in FIG. 4 and the treatment (i.e., operation) will be started by the power only set. That is to say, in the steps #1 and 2, when the open→close of the back lid 16 is confirmed by the above-mentioned switches $SW_2$ and $SW_4$, the later-described auto-load (vacant film feeding) will be made. When, in the steps #3 and 4, the close→open of the back lid 16 is confirmed by the switches $SW_2$ and $SW_4$, the winding motor 28 will reversely rotate for a fixed time, the winding back motor 35 will normally rotate for a fixed time and the output gear and transmission gear of each motor will be disengaged by the clutch mechanisms 34 and 39 comprising the above-mentioned planetary gear mechanism. Then, in the steps #5, 5' and 6, when it is detected that the back lid 16 is opened and that, by the variation of the on→off of the film insertion sensing switch $SW_1$, the film 15 is inserted at the tip into the film inserting port 17, the later-described pre-load (film winding running) will be made.

Then, in the steps #7 to 11, when it is detected by the releasing switch SW₅ that the releasing button is pushed, the exposing treatment will be made, then the treatment of winding up one frame of the film will be made, the film end will be sensed in the course of the winding up and then the winding back treatment will be made. The methods of this one frame winding up treatment and winding back treatment of the film are well known, are not the subject matter of the present invention and shall not be explained here for purposed of brevity.

Figure 6A:
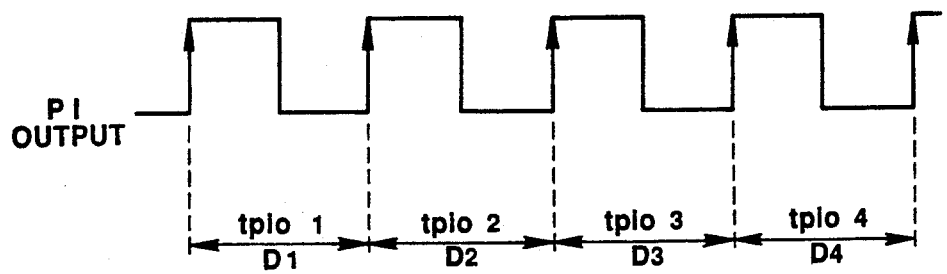
FIGS. 6A and 6B are diagrams respectively for explaining the contents of the operation made in a pre-loading treatment.
Figure 6B:
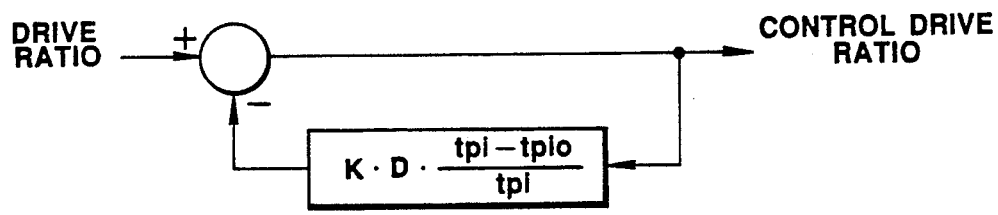

FIGS. 6A and 6B are diagrams for explaining the contents of the operation made in the above-described pre-loading treatment of the step #6. As shown in the same drawings, the range from the rise to the next rise of the PI pulse signal output from the above-mentioned photointerrupter PI is made one pulse, numbers are assigned in the order from the first pulse and the operation is made by the following calculating formulae:

$$D_1 = 15\% \tag{1}$$

$$D_2 = D_{2n-1} \tag{2}$$

$$D_{2n+1} = D_{2n-1} - K \cdot D_{2n-1}(tpi - tpio2n)/tpio \tag{3}$$

tpi: Object pulse width (time).
tpio: Pulse width (time).
D: Drive ratio.
K: Control proportion constant.
n: 1, 2, 4, - - - 24.

That is to say, $D_1 = 15\%$ of the above-mentioned formula (1) represents that the initial value of the drive ratio D is made 15, $D_2 = D_{2n-1}$ of the formula (2) represents that an even number order pulse is to use a drive ratio D of an odd number order pulse preceding by one and $D_{2n+1} = D_{2n-1} - K \cdot D_{2n-1}(tpi-tpio2n)/tpio$ of the formula (3) represents a proportion control and that the drive ratio for the odd number order pulse after the third pulse is to be calculated on the basis of the even number order pulse width preceding by one.

That is to say, the above-mentioned operation is made by the just preceding pulse width once in two pulses. This is a means for smoothly driving the control system where, even if the drive ratio is varied, the response of the control system is bad and the influenced pulse number is somewhat delayed.

Figure 7:
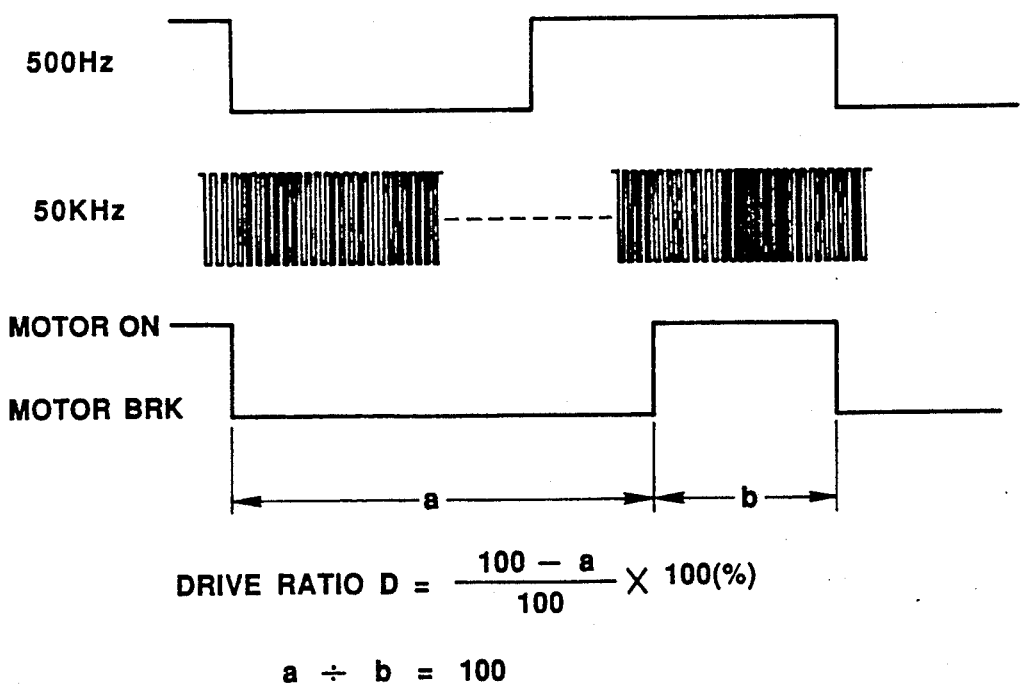
FIG. 7 is a waveform diagram for explaining a BRK (brake)/ON control signal.

FIG. 7 explains the BRK (brake)/ON control signal. The upper waveform represents a pulse signal of a frequency of 500 Hz, the middle waveform represents a pulse signal of a frequency of 50 KHz and the lower waveform represents a control signal of the motor. As the pulse numbers of the pulse signal of 500 Hz and pulse signal of 50 KHz output from the above-mentioned oscillator 58 (See FIG. 4) are in the relation of 1:100, the control drive ratio D which is an input is realized by outputting the BRK signal of a pulse width of 500 Hz as a control signal while the pulse of 50 KHz is counted (100-D) times and outputting the ON-signal while the pulse of 50 KHz is counted D times.

Figure 8:
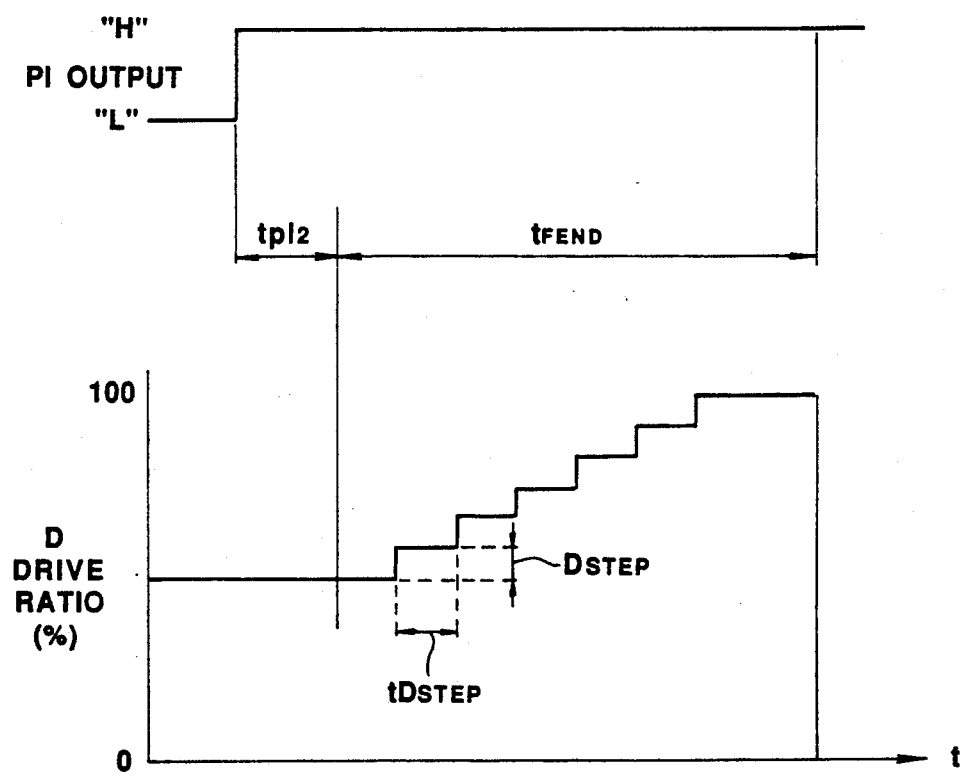
FIG. 8 is a waveform diagram for explaining a film end treatment.

In FIG. 8, the actual treatment is explained by supposing the case that the film ends or that the film is pressed and stopped by hand.

When the variation of the output of the PI pulse signal becomes nil and a predetermined time $t_{pi2}$ elapses, an overflow signal will be outputted from the above-mentioned edge width timing counter circuit 55 (See FIG. 4) and the above-mentioned step-up timing counter circuit 56 will start timing and, when a predetermined time $tD_{STEP}$ elapses, the operation controlling circuit 50 will make the operation of $$D \leftarrow D + D_{STEP}$$

to the drive ratio D and will increase the drive ratio every fixed time but this will not exceed 100%.

Then, the above-mentioned film end detecting counter circuit 57 (See FIG. 4) will start counting simultaneously with the above-mentioned step-up timing counter circuit 56 by the output of the above-mentioned overflow signal. When this counted value reaches a predetermined value (represented by $t_{FEND}$), the operation controlling circuit 50 will switch off the motor to end the the treatment.

Figure 9A:
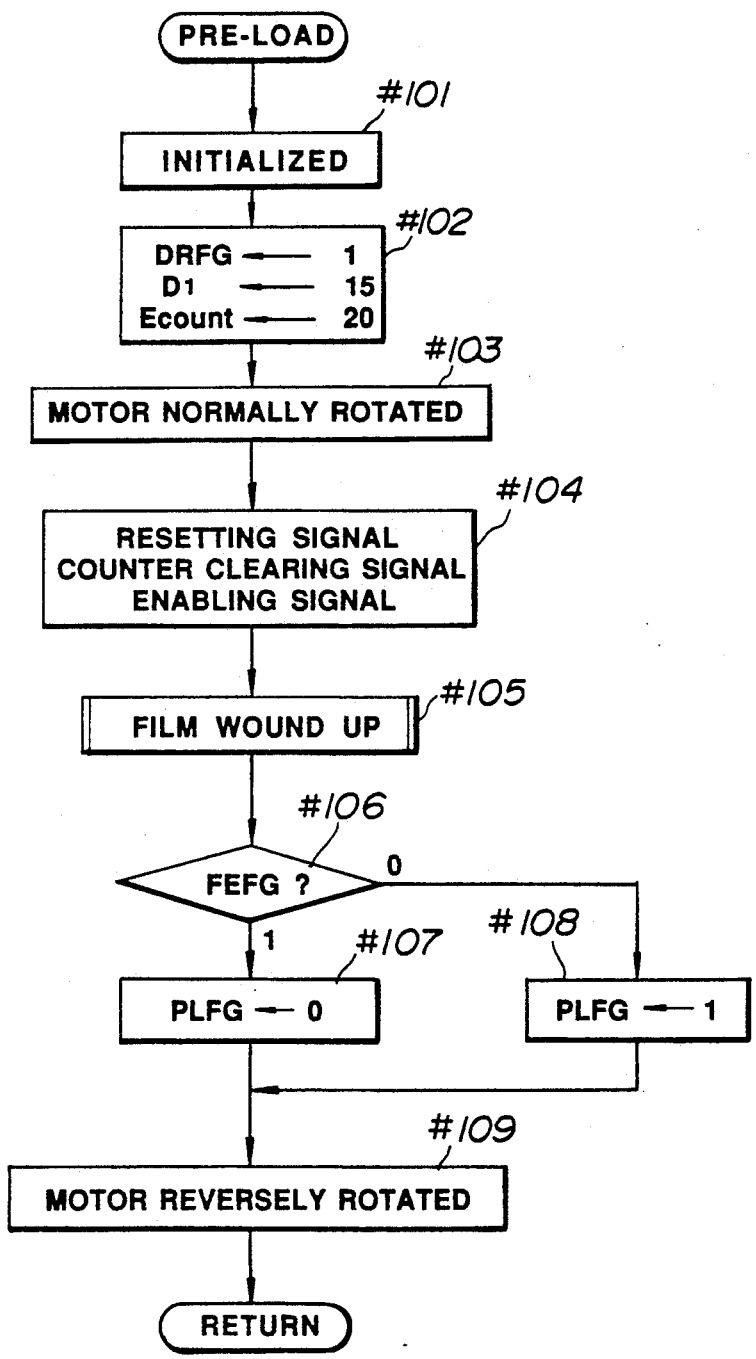
FIGS. 9A to 9C are flow charts of the pre-loading treatment of a film.
Figure 9B:
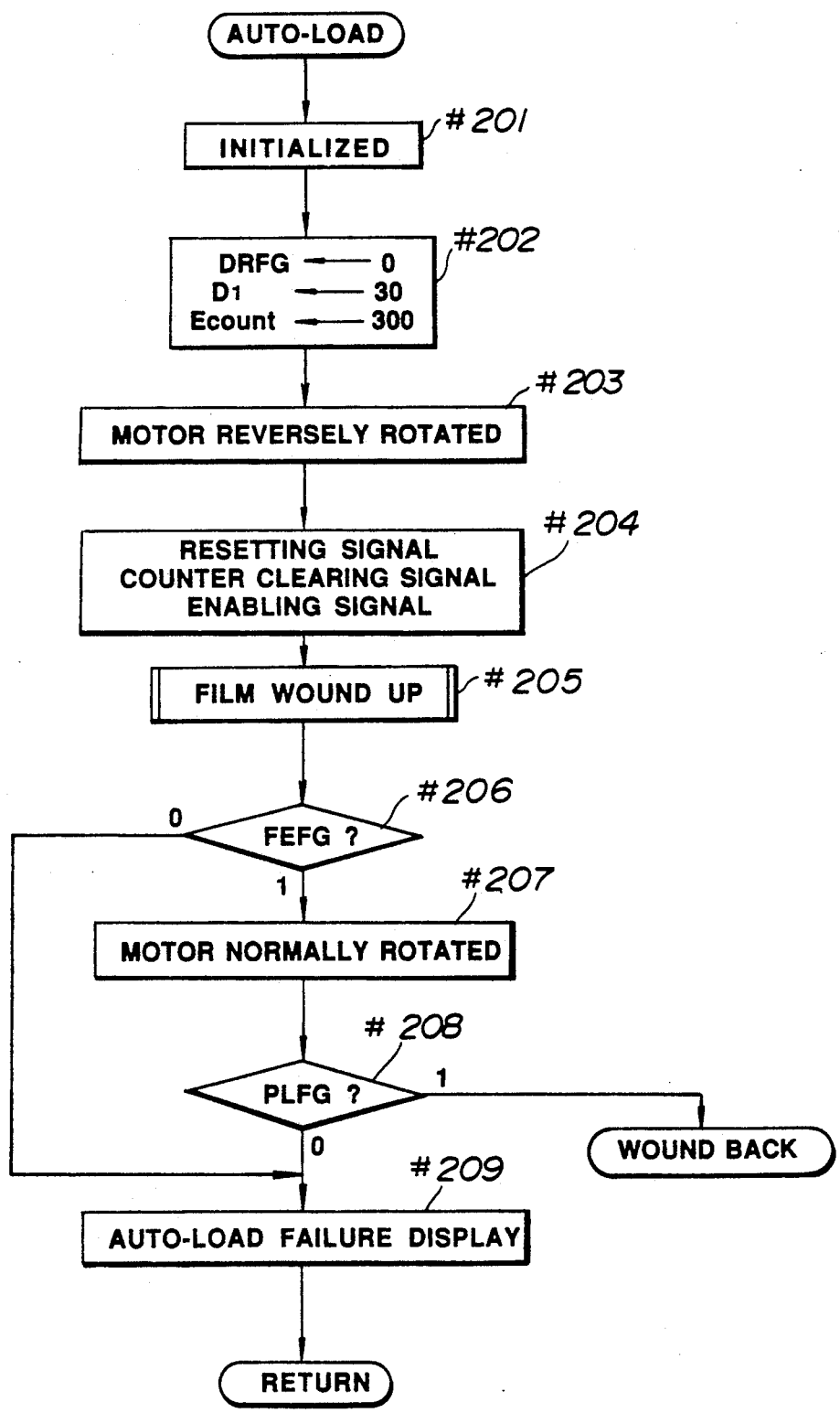
Figure 9C:
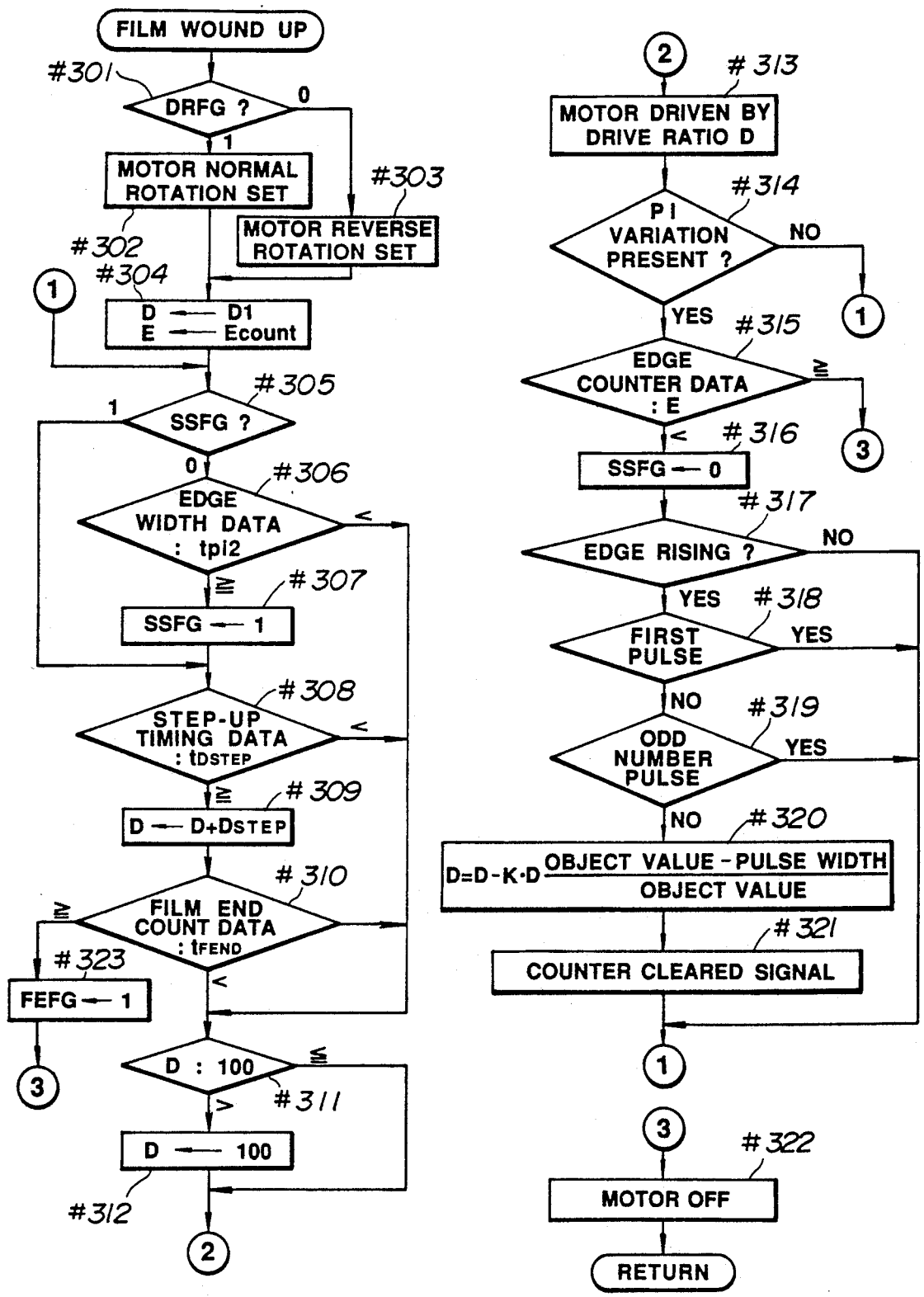

FIGS. 9A to 9C are flow charts in the case of the above-mentioned pre-loading treatment and auto-loading treatment by an MPU.

The pre-loading treatment shall be explained according to FIG. 9A.

First of all, in the step #101, the registers and flags to be used in the treatments are initialized. Then, in the step #102, 1 is set in DRFG, 15 is set in D1 and 20 is set in E count. DRFG is a flag determining the rotating direction of the winding motor 28. E count is a value showing a predetermined value of a film moving amount.

In the step #103, the motor is normally rotated for a predetermined time in order to mesh the clutch mechanism 34 with the driving gear 29. In the step #104, a resetting signal and counter clearing signal are outputt to clear the respective counters and an enabling signal is outputted to the signal generating circuit 51.

In the step #105, the later described sub-routine of winding up the film is carried out. In the step #106, FEFG is checked and, if FEFG is 0, that is, if the pre-load is completed, in the step #108, PLFG will be made 1. In case FEFG is 1, that is, in case the film is pressed with a hand or the like and the pre-load is not completed, in the step #107, PLFG will be made 0. Then, in the step #109, in order to disengage the clutch mechanism 34 from the driving gear 29, the motor is reversely rotated for a predetermined time to return to the step #1 in FIG. 5.

Then, the auto-loading treatment shall be explained according to FIG. 9B.

First of all, the registers and flags to be used in the treatment are initialized in the step #201. Then, in the step #202, the above-mentioned DRFG, D1 and E count are set respectively in 0, 30 and 300. In the step #203, in order to mesh the clutch mechanism 34 with the driving gear 31, the motor is reversely rotated for a predetermined time. In the step #204, a resetting signal, counter clearing signal and enabling signal are outputted. In the step #205, the sub-routine of winding up the film is carried out.

In the step #206, FEFG is checked and, if it is 0, the treatment will return to the step #1 in FIG. 5. If it is 1, in the step #207, the motor will be normally rotated for a predetermined time to disengage the clutch mechanism 34 from the driving gear 31. In the step #208, PLFG is checked. If PLFG is 0, the auto-load will be judged to have been made while the pre-load had not ended and, in the step #209, the auto-load failure will be displayed and the treatment will return to the step #1 in FIG. 5. If PLFG is 1, the film end will be judged and the treatment will jump to the winding back routine.

FIG. 9C is a flow diagram of a film winding sub-routine called in the above-described pre-loading treatment and auto-loading treatment.

First of all, in the step #301, DRFG is checked and, in the steps #302 and 303, if DRFG is 1, the motor rotating direction will be set to the normal rotation and, if it is 0, the direction will be set to the reverse rotation. In the step #304, the values of the set D1 and E count are set respectively to D and E. Then, in the step #305, the super-slow flag SSFG is checked. If SSFG is 1, the treatment will jump to the step #308 and, if it is 0, in the step #306, the edge width data which are the output of the edge width timing counter circuit 55 will be compared with tpi2. If the edge width data are below tpi2, the treatment will be branched to the step #311. If they are above tpi2, the film will be judged not to be moving and, in the step #307, SSFG will be erected (i.e., set to 1). Then, in the step #308, the step-up timing data which are the output of the step-up timing counter circuit 56 will be compared with $tD_{STEP}$. If the step-up timing data are below $TD_{STEP}$, the treatment will be branched to the step #311. If they are above, the treatment will shift to the step #309 and the drive ratio D will be stepped up (i.e., increased). That is to say, in the step #309, $D_{STEP}$ will be added to the drive ratio D.

Then, in the step #310, the film end count data which are the output of the film end detecting counter circuit 57 are compared with $t_{FEND}$. If the film end count data are above $t_{FEND}$, the film end will be judged, in the step #323, FEFG will be set and then the treatment will be branched to the step #322. If they are below, the treatment will shift to the step #311 and the drive ratio D will be compared with 100. As the drive ratio D must not exceed 100, in case it is larger than 100, in the step #312, the drive ratio D will be made 100.

Then, in the step #313, the motor is driven by dividing the driving time 2 m sec by the time ratio to BRK (short brake) and ON by the drive ratio D. Then, in the step #314, whether there is a variation of the PI pulse output signal or not is checked by the edge variation present signal from the PI signal generating circuit 52. If there is no variation of the PI output signal, the treatment will return to the step #305. If there is a variation, the treatment will shift to the step #315. At this time, the edge counter circuit 53, edge width timing counter circuit 55, step-up timing counter circuit 56, film end detecting counter circuit 57 and latch 59 will be cleared by the edge present signal.

In the step #315, the edge counter data which are the output of the edge counter circuit 53 are compared with E. If the edge counter data are above E, the film of a predetermined length will be judged to have been wound up and the the treatment will be branched to the step #322. In case they are below E, in the step #316, SSFG will be cleared and then, in the step #317, the rise of the edge of the PI pulse output signal will be checked. If this PI output signal is on the "H" level, the rise will be judged and the treatment will be branched to the step #318 but, if it is on the "L" level, the fall will be judged and the treatment will be branched to the step #305. In the step #318, whether it is the first pulse or not is checked. This is because the first pulse width since the motor drive is started can not be used for the control and is not calculated. Therefore, in the case of the first pulse, the treatment will be branched to the step #305. In the case of no first pulse, the treatment will shift to the step #319 and whether it is an odd number order pulse or not will be checked.

That is to say, as described above, the control is calculated by the even number order pulse width data and therefore, in the case of an odd number order pulse, the treatment will be branched to the step #305. In the case of an even number order pulse, in the step #320, the operation represented by the above-mentioned formula (3) will be made to calculate the control drive ratio D. In the step #321, the counter clearing signal is output, the pulse width timing counter circuit 54 is cleared and the treatment jumps to the step #305.

In the step #322 branched from the steps #323 and 315, an OFF-signal is outputted to the motor to return the treatment.

The above is the operation explanation of the pre-loading treatment and auto-loading treatment.

Figure 10:
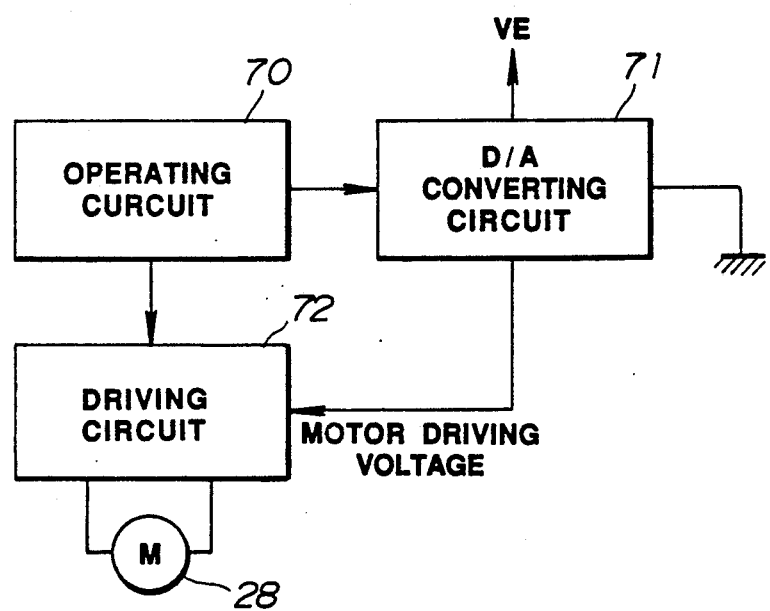
FIG. 10 is a block formation diagram of an essential part of an automatic film charging apparatus showing a second embodiment of the present invention.

FIG. 10 is a formation view of the essential part of the automatic film charging apparatus showing the second embodiment of the present invention. In the above-mentioned first embodiment, the effective voltage of the operating voltage applied to the winding motor 28 is controlled by alternately repeating the BRK (short brake) and ON-operation so that the motor speed may be of the optimum value. However, as shown in FIG. 10, this will be able to be realized even when the drive ratio data determined by the operating circuit 70 are D/A-converted by the D/A converting circuit 71, are varied as a motor driving voltage and are applied to the motor 28 through the driving circuit 72 to control the number of revolutions of the motor.

By the way, in this case, the drive ratio of 100% may be set for the power source battery output voltage and 0% may be set for the voltage value lower than the battery output voltage.

If a stepping motor or ultrasonic motor is used instead of using a DC motor for the motor and the rotating speed of the motor can be controlled by the corresponding driving circuit, the film feeding speed in the present invention will be able to be realized.

Figure 11A:
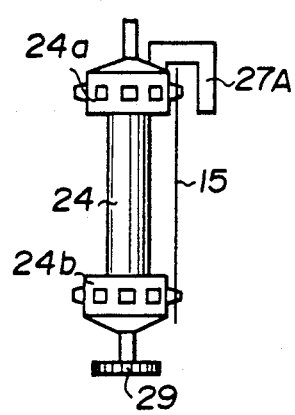
FIGS. 11A to 11C are respectively a side view, bottom view and back view showing a modification of a film feeding detecting mechanism.
Figure 11C:
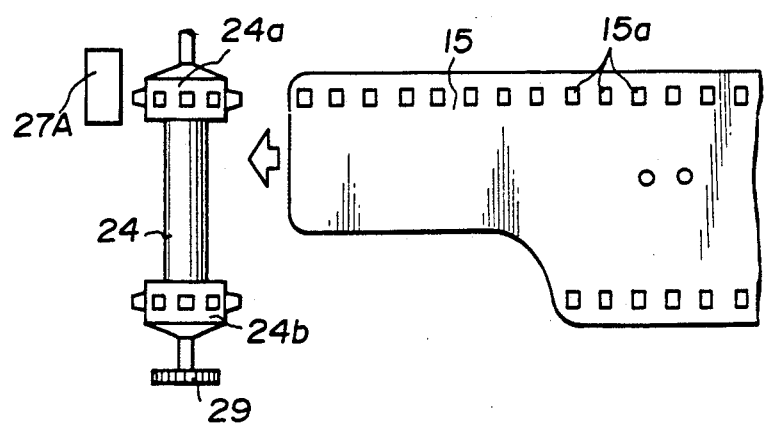
Figure 11B:
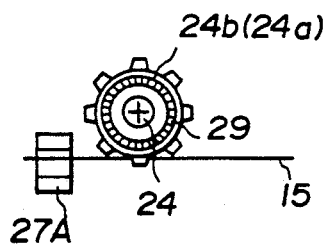
Figure 12:
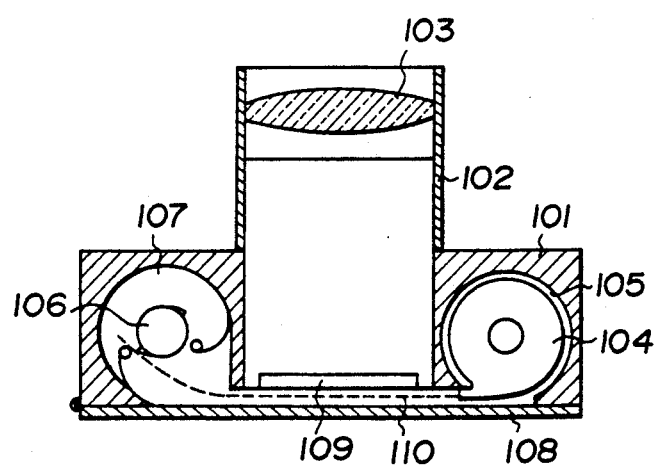
FIG. 12 is a plan view of an automatic film charging apparatus in a conventional camera.

Further, in the above-mentioned first embodiment, the film feeding detecting mechanism comprises the film insertion sensing switch $SW_1$, slit plate 26 fixed to the sprocket shaft for detecting the film speed and photointerrupter 27. However, when, as shown in FIGS. 11B and 11C, the photointerrupter 27A is arranged to hold the perforations 15a of the film 15 in the conveying path of the film 15 so that pulses may be outputted with the passage of the perforations 15a by this photointerrupter 27A, the variation of the pulses will be able to be substituted for the film insertion sensing switch $SW_1$ and the above-mentioned film perforations 15a will be able to be substituted for the slit plate 26.

On the other hand, in case the above-mentioned film insertion sensing switch $SW_1$ fails for the reason of a contact failure or mechanical trouble, it will remain on (abnormally ON) or will remain off (abnormally OFF) and will not perform the role inherent to the switch. Therefore, if the film insertion sensing switch $SW_1$ is formed as in the above-mentioned first embodiment, as a remedial treatment, when the switch state is checked just after the back lid is opened, if the switch is off, it will be judged to be normal but, if it is on, the switch $SW_1$ will be able to be judged to be abnormally on and broken. When it is abnormally on, if the PI pulse is checked and the variation of the PI pulse is sensed. The film will be judged to be inserted and will be wound in.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A camera characterized by comprising:
   a film housing chamber housing a film magazine containing film with perforations for cooperating with sprockets;
   an aperture defining a photographed picture;
   sprockets which are positioned on the side opposite the film housing chamber with the aperture positioned therebetween, on which the film, having passed the rear of the aperture, is wound and which have teeth meshing with the perforations of the film;
   a guiding means provided on the side of said sprockets to guide said film so as to be conveyed toward the rear of the camera; and
   a film spool provided within the back lid of the camera to wind up the film directed to the rear of the camera by said guiding means.

2. A camera according to claim 1 wherein the emulsion surface of the film is directed away from said sprocket.

3. A camera according to claim 1 wherein the emulsion surface is directed away from said sprocket and toward said spool.

4. A camera including a camera body having a back lid and being characterized by comprising:
   a film feeding chamber provided on the camera body side;
   a film winding chamber provided on the back lid side of the camera, having a film winding spool within and exposing a film inserting port on the camera body side;
   a back lid state detecting means for selectively detecting the opened and closed state of said back lid;
   a film insertion sensing means for detecting that the film is inserted into said film inserting port;
   a conveying means for conveying by a predetermined amount the film inserted into said inserting port toward said film winding spool;
   a film winding means for winding up said film by rotating said spool; and
   a controlling means for transmitting the driving force from said motor selectively to either of said conveying means and film winding means so that, when said back lid state detecting means is outputting a signal showing the opened state of said back lid, when said film insertion sensing means issues a signal, said conveying means may be driven and later, when said back lid state detecting means detects the closing operation of said back lid, said film winding means may be driven.

5. A film winding apparatus for a camera having a film housing chamber housing a film magazine and an aperture defining a photographed picture, comprising:
   winding sprockets positioned on the side opposite said film housing chamber with said aperture positioned between them for winding the film extending across the rear of said aperture so that a light sensitive surface of the film is directed away from said sprockets;
   a guiding member arranged so as to enclose said sprockets to guide a tip of said film;
   a spool arranged near said guiding member to wind up said film guided by said guiding member so that the light sensitive surface is directed toward said spool;
   a film winding motor for winding up said film;
   a transmitting mechanism for selectively transmitting the driving force of said film winding motor to said sprockets and said spool;
   a switching means for obtaining a starting signal of said film winding motor;
   a film shift detecting means for outputting a signal in response to the shift of said film; and
   a motor controlling means for starting said film winding motor by the signal of said switching means and stopping said film winding motor when the output of said film shift detecting means assumes a specific state.

6. A film winding apparatus according to claim 5 characterized in that said motor controlling means stops said film winding motor when the film shift amount determined from the output of said film shift detecting means reaches a predetermined value.

7. A film winding apparatus according to claim 5 characterized in that said motor controlling means stops said film winding motor when the output of said film shift detecting means is not outputted over a predetermined time.

8. A film winding apparatus according to claim 5 characterized in that said transmitting mechanism has a switching mechanism whereby, when said film winding motor is started, the driving force of said motor is transmitted to said sprockets and, after said film is shifted by a predetermined amount capable of being wound on said spool, the driving force of said motor is transmitted to said spool.

9. A camera comprising a camera body having a film housing chamber housing a film magazine and a aperture defining a photographed picture and a back lid member swingably fitted to said camera body by a hinge so as to be free to open and close wherein said back lid member comprises:
   sprockets for winding the film extending across the rear of said aperture so that the light sensitive surface of said film is directed away from said sprockets;
   a guiding member arranged so as to enclose said sprockets to guide a tip of said film;
   a winding spool arranged near said guiding member to wind said film guided by said guiding member so that the light sensitive surface of said film is directed toward said spool;
   a film winding motor for winding up said film; and
   a transmitting mechanism for selectively transmitting the driving force of said film winding motor to said sprockets and said spool.

10. A camera having:
    a camera body, a film housing chamber in said camera body housing a film magazine and an aperture defining a photographed picture; and
    a back lid member, and sprockets for winding a film strip extending from said magazine and across the rear of said aperture, a guiding member arranged to enclose said sprockets to guide a tip of said film, a winding spool arranged near said guiding member to wind said film guided by said guiding member so that the light sensitive surface of the film strip is directed toward said sprocket; a film winding motor for winding up said film; and a transmitting mechanism for selectively transmitting the driving force of said film winding motor to said sprockets and said spool, characterized by further having:

a switching means for obtaining a starting signal of said film winding motor;

a film shift detecting means for outputting a signal in response to the shift of said film; and a motor controlling means for starting said film winding motor responsive to the signal of said switching means and stopping said film winding motor when the output of said film shift detecting means assumes a specific state.

11. A camera according to claim 10 characterized in that said motor controlling means halts said film winding motor when the film shift amount determined from the output of said film shift detecting means assumes a predetermined value.

12. A camera according to claim 10 characterized in that said motor controlling means halts said film winding motor when the output of said film shift detecting means is not outputted within a predetermined time.

13. A camera according to claim 10 characterized in that said transmitting mechanism has a switching mechanism whereby, when said film winding motor is started, the driving force of said motor is transmitted to said sprockets and, after said film is shifted by a predetermined amount capable of being wound on said spool, the driving force of said motor is transmitted to said spool.

14. A camera comprising a camera body and a lens;

said camera body having a hollow interior region communicating with said lens and providing a film aperture window;

a film housing chamber in said camera body arranged on one side of said film aperture window;

a cover lid hingedly connected to said camera body and having a film winding chamber extending rearwardly from said camera body for receiving a film strip extending out of a film magazine and across said film aperture window; and means for winding said film strip in said film winding chamber.

15. The camera of claim 14 further comprising sprocket means mounted within said cover lid for advancing the film strip into said film winding chamber; and spool means in said film winding chamber for winding up the film strip delivered thereto by said sprocket means.

16. The camera of claim 15 further comprising guide means for guiding the film strip about said sprocket means.

17. The camera of claim 15 further comprising drive means for selectively coupling drive power to said sprocket means and said spool means.

18. The camera of claim 15 wherein said means for winding is activated responsive to closure of said cover lid.

19. The camera of claim 15 wherein said means for winding drives said sprocket means responsive to first detection means for detecting the advancement of a tip of the film to said sprocket means and for driving said spool means when a second detecting means detects the movement of said film for a predetermined interval.

20. The camera of claim 19 wherein said second detecting means senses the passage of perforations provided in said film for cooperation with said sprocket means.

* * * * *

UNITED STATES PATENT AND TRADEMARK OFFICE
CERTIFICATE OF CORRECTION

PATENT NO. : 5,075,708

DATED : December 24, 1991

INVENTOR(S) : Okumura et al.

It is certified that error appears in the above-identified patent and that said Letters Patent is hereby corrected as shown below:

Column 2, line 23, change "waveform and circuit" to --partially exploded--

Column 2, line 29, change "appartus" to --apparatus--

Column 2, line 31, after "are" insert --waveform and circuit--

Column 3, line 35, change "above mentined" to -- above-mentioned --

Column 7, line 12, change "purposed" to --purposes--

Column 8, line 17, delete second occurrence of "the"

Column 8, line 33, change "outputt" to --outputted--

Column 9, line 55, delete the first occurrence of "the"

Column 12, line 39, change "and a" to --and an--

Signed and Sealed this

Sixth Day of April, 1993

*Attest:*

STEPHEN G. KUNIN

*Attesting Officer*     *Acting Commissioner of Patents and Trademarks*